Nov. 14, 1933.  H. HEINE  1,935,444
MICROSCOPE
Filed Dec. 17, 1931   2 Sheets-Sheet 1
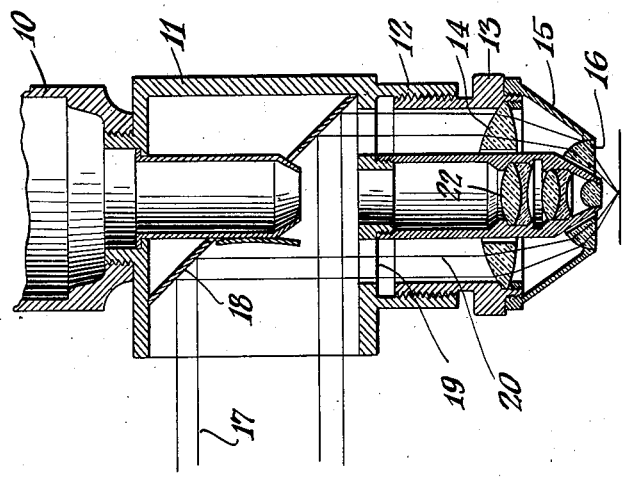
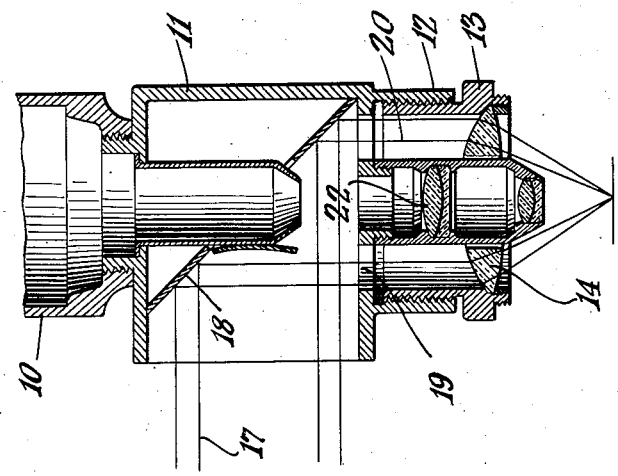
INVENTOR
Hermann Heine
BY
ATTORNEY Nov. 14, 1933.  H. HEINE  1,935,444
MICROSCOPE
Filed Dec. 17, 1931  2 Sheets-Sheet 2

INVENTOR
Hermann Heine
BY
George C. Heimitz
ATTORNEY

Patented Nov. 14, 1933

1,935,444

UNITED STATES PATENT OFFICE 1,935,444

MICROSCOPE

Hermann Heine, Wetzlar, Germany, assignor to Ernst Leitz Optische Werke, Wetzlar, Germany Application December 17, 1931, Serial No. 581,568, and in Germany December 19, 1930

1 Claim. (Cl. 88—40)

This invention relates to improvements in microscopes particularly microscopes in which the illuminating rays are directed towards the underside of the specimen by means of a glass condenser, as for instance described in Patent No. 1,853,689, issued April 12, 1932, and it is the principal object of this invention to provide one or more condensers having ring-shape.

Another object of my invention is the provision of a microscope in which the objective and condenser are surrounded by a watertight or fluid tight submersion cap.

Still another object of my invention is the provision of a fluid tight cap for the objective and the condenser of microscopes of the above type, provided with a spring to hold the cap adjustably in place on the condenser frame.

A further object of my invention is the provision of a spring controlled objective and condenser cap provided with means on the spring of the cap to hold the front face of the same at a certain distance from the objective.

A still further object of my invention is the provision of a submersion cap for the objective and condenser of microscopes provided with means for allowing the flat front disc of the cap to be adjusted into close proximity to the front lens for allowing the introduction of an immersion fluid between front lens and disc of the cap.

These and other objects and advantages of my invention will become more fully known as the description thereof proceeds and will then be more specifically defined in the appended claim.

In the accompanying drawings forming a material part of this disclosure:

Fig. 1 is a fragmentary central vertical sectional view of a microscope equipped with an annular condenser constructed according to my invention in raised position.

Fig. 2 is a view similar to Figure 1, with two annular condensers in lowered position.

Figure 4:
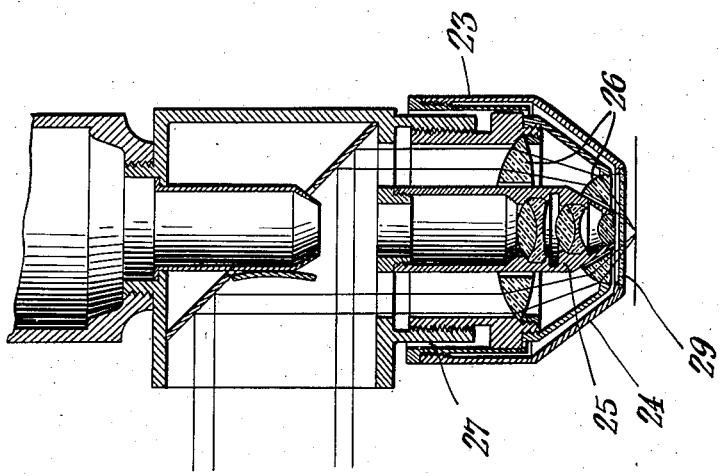
Fig. 4 is a view similar to Figure 3, with a plurality of annular condensers and immersion cap.

As illustrated in Figures 1 and 2, the customary vertical microscope tube 10 carries a housing 11 into the restricted part 12 of which is screwed the condenser frame 13 for the annular lens 14, or as for instance shown in Figure 2, a substantially conically-shaped frame 15 is attached to frame 13 and carries another ring-shaped or annular condenser 16.

In operation, the incoming light-rays represented by the lines 17—17 are reflected by the inclined reflector 18 through the openings 19 along the lines 20, parallel to the central axis of the microscopes and thence into and through the ringshaped or annular condenser 14 or condensers 14 and 16 in which the rays are condensed and reflected or directed onto the specimen. The rays reflecting the picture of the specimen pass through the objective or objectives 22, the path of the illuminating light rays before they enter the condenser or condensers being external to the image-forming optical system in which the condenser or condensers are adjustable in relation to the objective or objectives which they surround so that the focal point of the condenser or condensers can be varied in relation to that of the objective or objectives.

Figure 3:
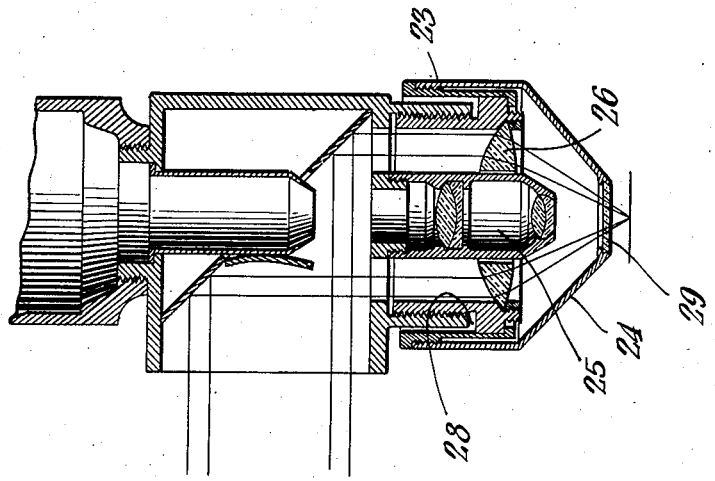
Fig. 3 is a fragmentary central vertical sectional view of a microscope equipped with an annular condenser and an immersion cap according to my invention.

In Figures 3 and 4, I have shown the devices illustrated in Figures 1 and 2 equipped with an immersion cap 23 equipped with a level glass plate 24 surrounding an objective or objectives 25 and a condenser or condensers 26 watertight. Cap 23 is equipped with a spring 27 adapted to hold the cap readily adjustable on the condenser frame. The spring 27 carries an abutment 28 distancing the cap from the objective. The cap 23 has a front disc 29 which can be adjusted closely to the front lens of one of the objectives 25 to permit the introduction of an immersion fluid into the space between cap disc and front lens.

The operation is in substance the same as described with the form of my invention illustrated in Figures 1 and 2.

It will be understood that I have described and shown the preferred forms of my device only as examples of the many possible ways to practically construct the same, and that I may make such changes in the general arrangement of the microscope and in the construction of the minor details thereof as come within the scope of the appended claim without departure from the spirit of my invention and the principles involved.

Having thus described my invention, what I claim as new and desire to secure by Letters Patent is:

In microscopes including a system of objectives, and a pair of ring-shaped condensers surrounding said system of objectives, a housing carried by the microscope tube and having a restricted part, an inclined reflector in said housinf, a frame for one of said ring-shaped condensers screwed into the restricted part of said housing, a conically shaped frame attached to said first-named frame carrying the other of said condensers, the light rays received by said reflector being reflected parallel to the central axis of the microscope externally to the system of objectives to form a hollow bundle, and through said condensers to the underside of the specimen, and the rays reflecting the picture of the specimen passing through the system of objectives, and a means for adjusting said condensers in relation to the system of objectives for varying the focal points of condensers in relation to the objectives.

HERMANN HEINE.